(12) United States Patent
Ma (10) Patent No.: US 11,750,073 B2
(45) Date of Patent: Sep. 5, 2023

(54) VIBRATION MOTOR

(71) Applicant: AAC Microtech (Changzhou) Co., Ltd., Changzhou (CN)

(72) Inventor: Jie Ma, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 95 days.

(21) Appl. No.: 17/541,289

(22) Filed: Dec. 3, 2021

(65) Prior Publication Data

US 2022/0294323 A1     Sep. 15, 2022

(30) Foreign Application Priority Data

Mar. 15, 2021   (CN) ......................... 202120537535.8

(51) Int. Cl.
*H02K 33/02*   (2006.01)
*H02K 33/16*   (2006.01)
*B06B 1/04*    (2006.01)

(52) U.S. Cl.
CPC ............. *H02K 33/02* (2013.01); *H02K 33/16* (2013.01); *B06B 1/045* (2013.01)

(58) Field of Classification Search
CPC ..................... B06B 1/045; H02K 33/00–33/18
See application file for complete search history.

(56) References Cited

U.S. PATENT DOCUMENTS 10,742,104 B2 *   8/2020   Zhu ........................ H02K 33/02

* cited by examiner

*Primary Examiner* — Ramon M Barrera
(74) *Attorney, Agent, or Firm* — W&G Law Group (57) ABSTRACT

One of the objects of the present invention is to provide a vibration motor with reduced size and enables easier manufacturing process. To achieve the above-mentioned object, the present invention provides a vibration motor having a housing with an accommodation space; a vibrator accommodated in the accommodation space; a stator fixed to the housing for driving the vibrator to vibrate; and a spring suspending the vibrator in the accommodation space. The spring includes a first fixed part connecting to the housing, a second fixed part connecting to the vibrator, and an elastic arm connecting the first fixed part to the second fixed part.

9 Claims, 5 Drawing Sheets

VIBRATION MOTOR

FIELD OF THE PRESENT DISCLOSURE

The present disclosure relates to motors, in particular to a linear vibration motor for providing tactile feedback.

DESCRIPTION OF RELATED ART

For motors on the market, the commonly used springs are V-shaped springs and splicing springs. Wherein, the rounded corners of the joints of the two bending parts of the V-shaped spring are wide open. Make the distance between the two bending parts larger, which will occupy a larger area inside the motor. In addition, the rounded corner molding has high manufacturing requirements. The two spring pieces of spliced spring need to be formed separately and then spliced together, and the splicing process requires high.

Therefore, it is necessary to provide a product that can solve the above-mentioned problems.

SUMMARY OF THE PRESENT INVENTION

One of the objects of the present invention is to provide a vibration motor with reduced size and enables easier manufacturing process.

To achieve the above-mentioned objects, the present invention provides a vibration motor having a housing with an accommodation space; a vibrator accommodated in the accommodation space; a stator fixed to the housing for driving the vibrator to vibrate; and a spring suspending the vibrator in the accommodation space. The spring includes a first fixed part connecting to the housing, a second fixed part connecting to the vibrator, and an elastic arm connecting the first fixed part to the second fixed part.

The elastic arm includes a connection part, a first elastic part extending from one end of the connection part to the first fixed part, and a second elastic part extending from the other end of the connection part to the second fixed part.

The connection part includes a first bending part extending from an end of the first elastic part away from the first fixed part, a second bending part extending from an end of the second elastic part away from the second fixed part, and a middle connection part connecting the first bending part to the second bending part. The first bending part, the second bending part and the middle connection part are integrally formed. The first bending part attaches to the second bending part.

In addition, the first bending part attached to the second bending part by welding.

In addition, an outer wall surface of the middle connection part is arcuate.

In addition, the outer wall surface of the middle connection part and an outer wall surface of the first bending part intersect to form a first joint; a cut surface of the outer arc surface of the middle connection part at the first joint is in the same plane as the outer wall surface of the first bending part. The outer wall surface of the middle connection part and an outer wall surface of the second bending part intersect to form a second joint. The cut surface of the outer arc surface of the middle connection part at the second joint is in the same plane as the outer wall surface of the second bending part.

In addition, the first bending part, second bending part, first elastic part, second elastic part, first fixed part and second fixed part are all sheet structures.

In addition, a distance between the first elastic part and the second elastic part gradually increases along a direction from the front end to the rear end of the first elastic part and the second elastic part.

In addition, the first fixed part and the second fixed part are arranged in parallel and spaced apart from each other.

Further, the first bending part includes: a rectangular first bending sub-part having a front end connected to the middle connection part; a trapezoidal second bending sub-part connecting to the first bending sub-part on a same plane, having a rear end connected to the first elastic part. A width of the front end of the second bending sub-part is consistent with a width of the first bending sub-part. The width of the front end of the second bending sub-part is greater than a width of the rear end of the second bending sub-part.

The second bending part includes a rectangular third bending sub-part having a front end connected to the middle connection part; a trapezoidal fourth bending sub-part connecting to the third bending sub-part on a same plane, having a rear end connected to the second elastic part. A width of the front end of the fourth bending sub-part is consistent with a width of the third bending sub-part; the width of the front end of the fourth bending sub-part is greater than a width of the rear end of the fourth bending sub-part.

In addition, the first fixed part includes a trapezoidal first fixed sub-part having a front end connected to the first elastic part; a rectangular second fixed sub-part connected to the first fixed sub-part on a same plane. A width of the front end of the first fixed sub-part is smaller than a width of the rear end of the first fixed sub-part. The width the front end of the second fixed sub-part is consistent with a width of the rear end of the first fixed sub-part.

The second fixed part includes a trapezoidal third fixed sub-part having a front and a rear end; a rectangular fourth fixed sub-part connected to the third fixed sub-part on a same plane; a front end of the third fixed sub-part is connected to the second elastic part. A width of the front end of the third fixed sub-part is smaller than a width of the rear end of the third fixed sub-part; the width of the fourth fixed sub-part is consistent with a width of the rear end of the third fixed sub-part.

In addition, a width of both ends of the first elastic part is greater than a width of the middle part of the first elastic part; a width of the front end of the first elastic part is consistent with the width of the rear end of the second bending sub-part. The width of the rear end of the first elastic part is consistent with the width of the front end of the first fixed sub-part. The width of both ends of the second elastic part is greater than the width of the middle part of the second elastic part. The width of the front end of the second elastic part is consistent with the width of the rear end of the fourth bending sub-part. The width of the rear end of the second elastic part is consistent with the width of the front end of the third fixed sub-part.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain the disclosure, not intended to limit the disclosure.

As shown in FIGS. 1-5, a vibration motor in accordance with an exemplary embodiment, includes a housing 1 with an accommodation space 11, a vibrator 2 accommodated in accommodation space 11, a stator 3 and a spring 4. The spring 4 supports the vibrator 2 in the accommodation space 11. The stator 3 is fixed to the housing 1 and drives the vibrator 2 to vibrate. The spring 4 includes a first fixed part 41 fixedly connected to the housing 1, a second fixed part 42 fixedly connected to vibrator 2, and an elastic arm connecting first fixed part 41 and second fixed part 42. The elastic arm includes a connection part, a first elastic part 46 that extends from one end of the connection part to the first fixed part 41, and a second elastic part 47 that extends from the other end of the connection part to the second fixed part 42. The connection part includes a first bending part 43, which extends from the end of the first elastic part 46 away from the first fixed part 41. The second bending part 44 extends from the end of the second elastic part 47 away from the second fixed part 42. And the middle connection part 45 which connects first bending part 43 and second bending part 44. First bending part 43, second bending part 44 and middle connection part 45 are integrated. And first bending part 43 and second bending part 44 are attached to each other.

Compared with the splicing spring used by the existing vibration motor, the vibration motor 100 provided by the embodiment of the present invention adopts middle connection part 45 of the spring 4 which is integrally formed in the first bending part 43 and the second bending part 44. Specifically, an unprocessed blank plate is folded 180° to form two folds. the fold is the middle connection part 45, and the part connected to the middle connection part 45 is the first bending part. 43 and second bending part 44. Moreover, the first bending part 43 and the second bending part 44 are arranged closely to each other through folding, that is, the splicing process of the first bending part 43 and the second bending part 44 is not high. Compared with the V-type spring used by the existing vibration motor, the vibration motor 100 provided by the embodiment of the utility model adopts the middle connection part 45 of spring 4. The bend and fillet design in the V-shaped spring has been cancelled. This makes the spring 4 compact and the overall volume is small, and the size of the middle connection part 45 of the spring 4 is required. The manufacturing requirements are small, the yield is high, and it is suitable for mass production.

In summary, compared with the prior art, the beneficial effects of the vibration motor 100 are at least as follows: The vibrator 2 in the vibration motor is mainly supported by the spring 4 in the accommodation space 11 of the housing 1. Specifically, the spring 4 connects first bending part 43 and second bending part 44 through a middle connection part 45. The first bending part 43 and the second bending part 44 are stacked on top of each other and closely attached to each other. And the middle connection part 45, first bending part 43 and second bending part 44 are integrated into a structure. The structure of the spring 4 is compact and the overall volume is small, so that when the spring 4 is assembled in the vibration motor, the spring 4 occupies a small space in the vibration motor. This effectively reduces the volume of the vibration motor. Second, because the middle connection part 45 only needs to connect the first bending part 43 and the second bending part 44 together, the size requirements and process manufacturing requirements of the middle connection part 45 are not high. High yield rate is suitable for mass production of vibration motor. Third, middle connection part 45, first bending part 43 and second bending part 44 are integrated structures. The first bending part 43 and the second bending part 44 are folded 180° at the middle connection part 45, so that the first bending part 43 and the second bending part are not closely attached to each other. The splicing process requirements are low, which effectively reduces the manufacturing process requirements of the vibration motor.

Figure 2:
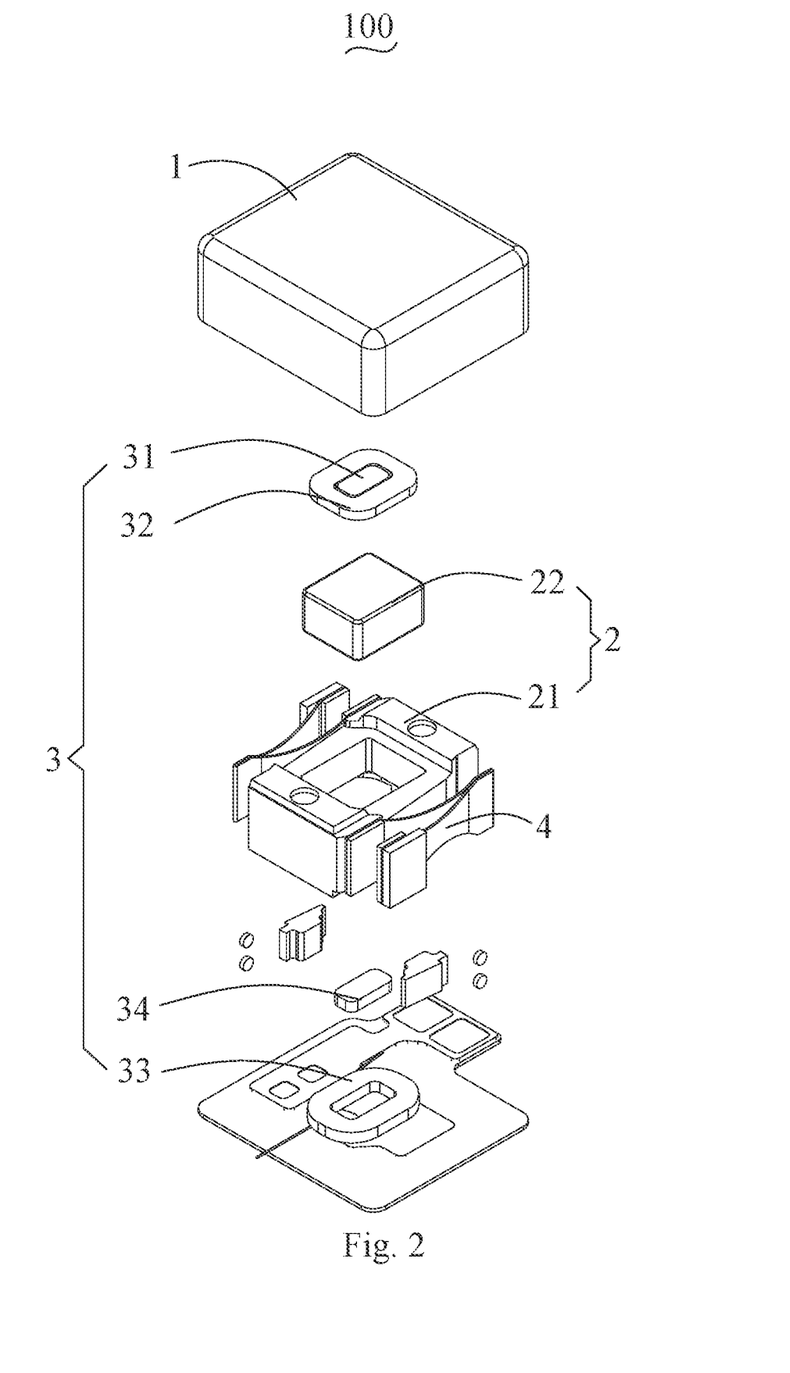
FIG. 2 is an exploded and isometric view of the vibration motor.
Figure 3:
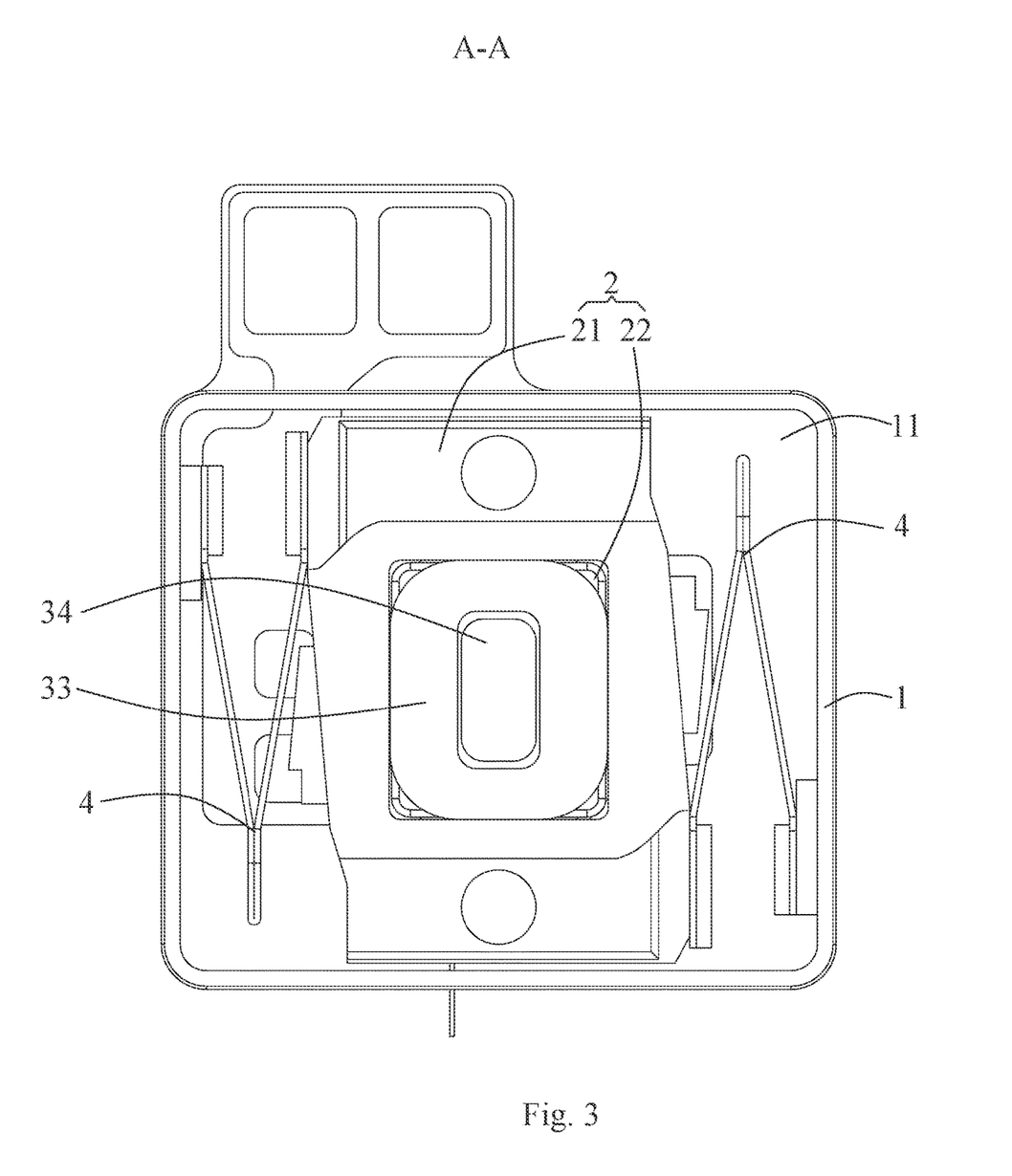
FIG. 3 is a cross-sectional view of the vibration motor taken along line AA in FIG. 1.

Specifically in some embodiments, as shown in FIG. 2 and FIG. 3, the vibrator 2 includes a weight 21 and a magnet 22. The magnet 22 can be embedded in the weight 21. The first fixed part 41 in spring 4 can be attached to the inner wall of housing 1. The second fixed part 42 can be attached to the weight 21 so that the weight 21 and the magnet 22 embedded in the weight 21 can be suspended in the housing 1. The stator 37 includes a permeable sheet 31, a copper ring 32, a coil 33 and a pole core 34. Along the thickness direction of the housing 1, the permanent sheet 31 and the copper ring 32 may be located at one end of the weight 21. The coil 33 and the pole core 34 may be located at the other end of the weight 21.

Specifically in some embodiments, as shown in FIGS. 2 and 3, the first elastic part 46 can be integrated with the first bending part 43. second elastic part 47 can be integrated with second bending part 44. The first fixed part 41 can also be integrated with the first elastic part 46. The second fixed part 42 can also be integrated with the second elastic part 47. That is, middle connection part 45, first bending part 43, second bending part 44, first elastic part 46, second elastic part 47, first fixed part 41 and second fixed part 42 are integrated into a structure. That is to say, only one set of molds is needed to manufacture spring 4, which is highly economical.

Figure 4:
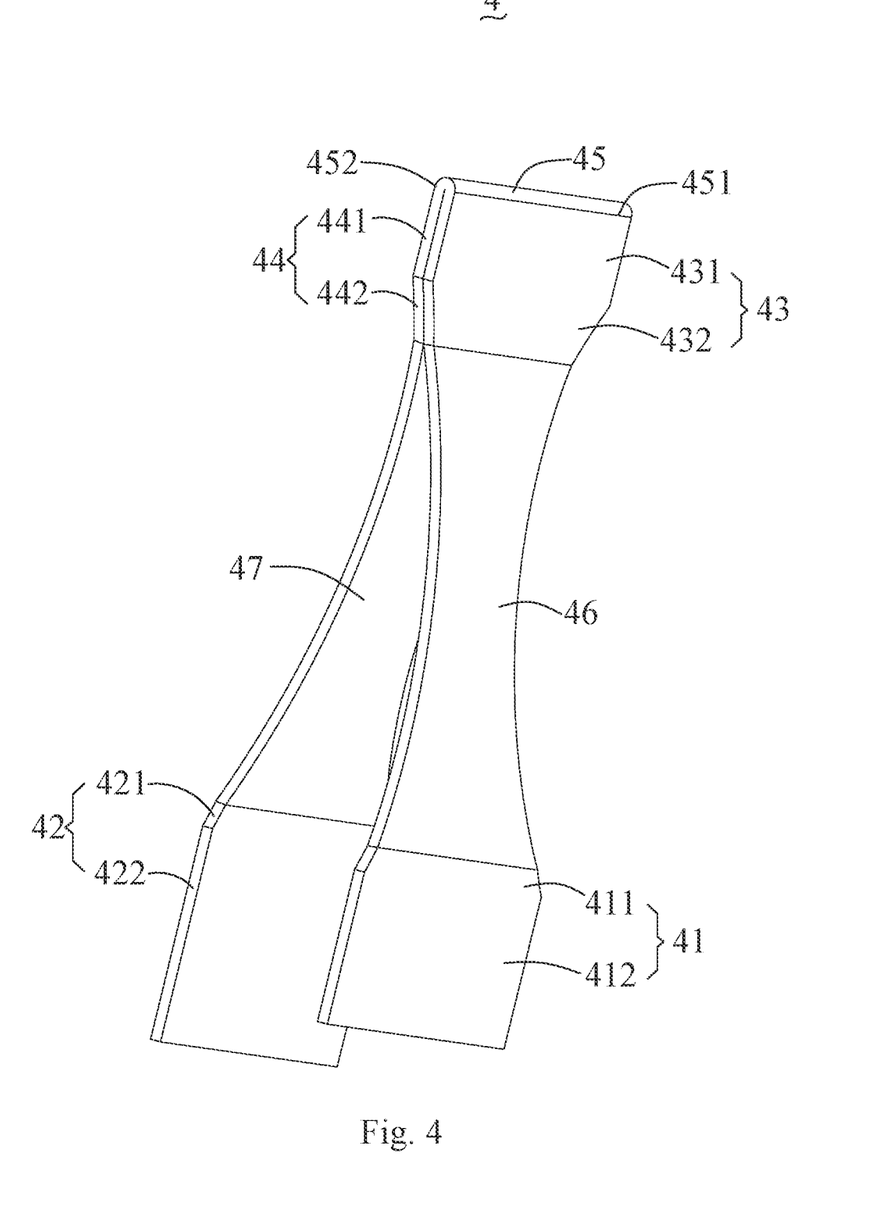
FIG. 4 is an isometric view of a spring of the vibration motor.
Figure 5:
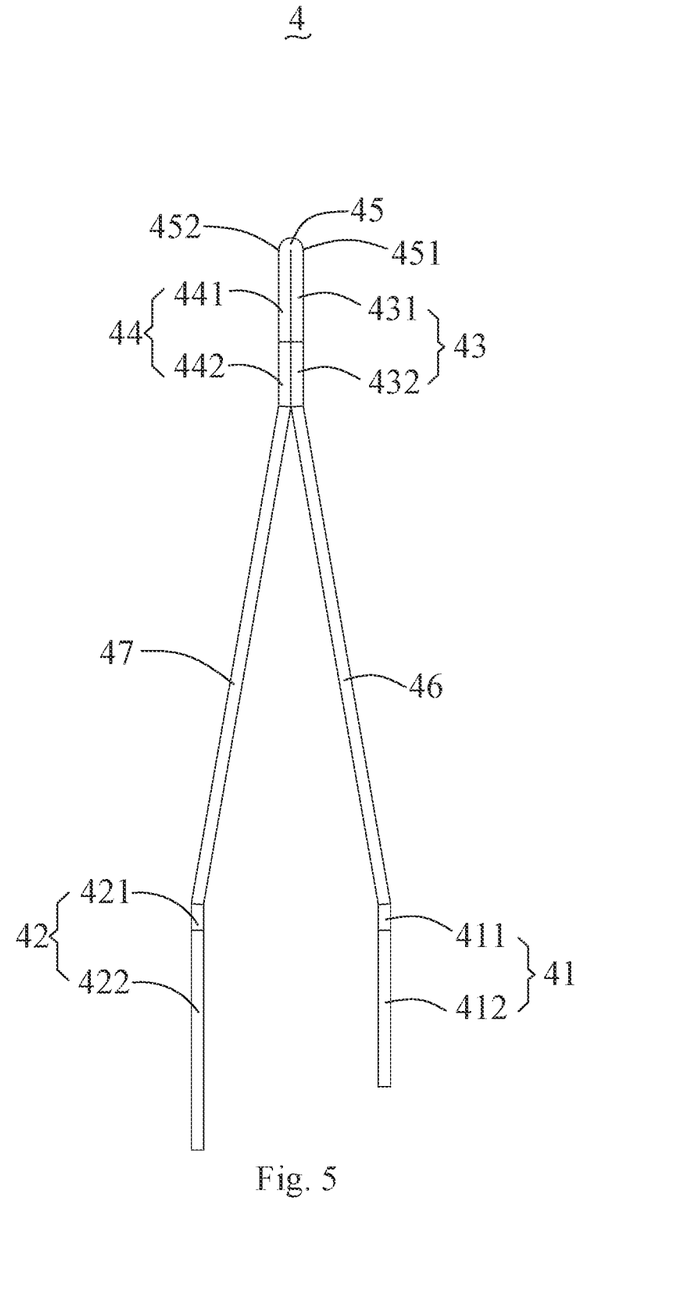
FIG. 5 is a front view of the spring in FIG. 4.

Understandably, as shown in FIGS. 4 and 5, an unprocessed blank plate is folded 180° to form two folded edges, and the folded edges are folded at two different positions on each folded edge. Thus, the folded edge is divided into first bending part 43, second bending part 44, first elastic part 46, second elastic part 47, first fixed part 41 and second fixed part 42.

Specifically in some embodiments, as shown in FIG. 5, middle connection part 45, first bending part 43, second bending part 44, first elastic part 46, second elastic part 47, first fixed part 41 and second fixed part 42 are all formed by turning over a blank plate. Therefore, first bending part 43, second bending part 44, first elastic part 46, second elastic part 47, first fixed part 41 and second fixed part 42 can all be sheet structures. In addition, the thickness of first bending part 43, second bending part 44, first elastic part 46, second elastic part 47, first fixed part 41 and second fixed part 42 can be the same.

Specifically, in some embodiments, the position where the first bending part 43 and the second bending part 44 are attached to each other can be fixedly connected by welding. That is, the two first bending part 43 and second bending part 44 are connected through the middle connection part 45. And after the first bending part 43 and the second bending part 44 are attached to each other, the joints are fixedly connected by welding. In order to strengthen the connection strength of the middle connection part 45, and the requirement for splicing technology is low.

Specifically in some embodiments, as shown in FIG. 4, the middle connection part 45 is formed by a 180° turning of an unprocessed board. Then the outer wall surface of the middle connection part 45 can be arcuate.

Specifically, in some embodiments, as shown in FIG. 5, the outer wall surface of the middle connection part 45 may intersect with the outer wall surface of the first bending part 43 to form a first joint 11. The cross section of the outer wall surface of the middle connection part 45 at the first joint 11 may be in the same plane as the outer wall surface of the first bending part 43.

Similarly, the outer wall surface of the middle connection part 45 can intersect with the outer wall surface of the second bending part 44 to form a second joint 11. The cross section of the outer wall surface of the middle connection part 45 at the second joint 11 may be in the same plane as the outer wall surface of the second bending part 44. In order to avoid the bending and round corner design of the connection part, the spring 4 has a compact structure and a small overall volume.

Specifically in some embodiments, as shown in FIG. 5, the distance between the first elastic part 46 and the second elastic part 47 can gradually increase along the direction from the front end to the rear end of the first elastic part 46 and the second elastic part 47. That is, first elastic part 46 and second elastic part 47 are in an open state.

Figure 1:
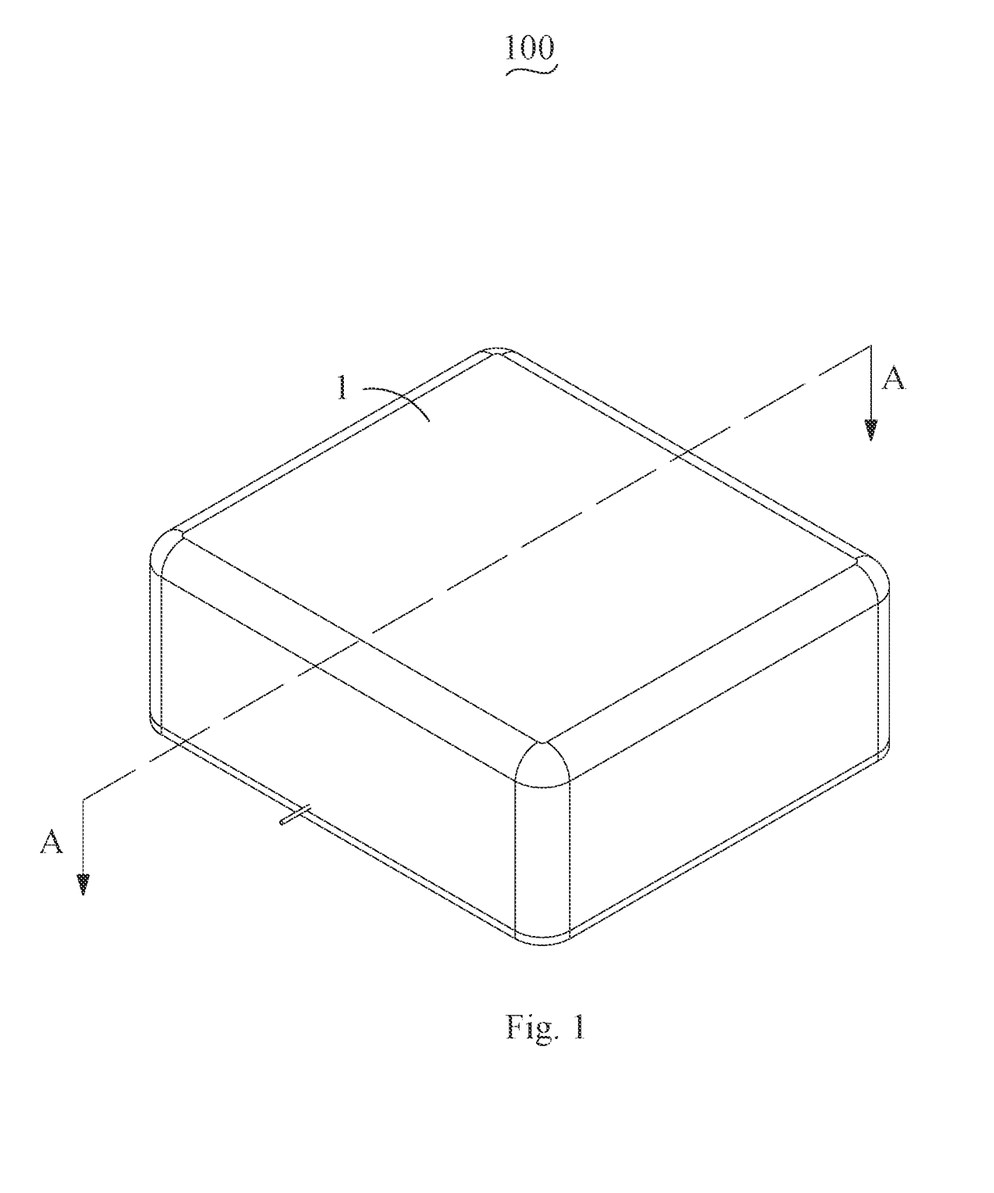
FIG. 1 is an isometric view of a vibration motor in accordance with an exemplary embodiment of the present invention.

Specifically, in some embodiments, as shown in FIGS. 1 and 3, the first fixed part 41 and the second fixed part 42 are in a sheet-like structure. The first fixed part 41 and the second fixed part 42 can be arranged in parallel, so that the first fixed part 41 can be conveniently attached to the inner wall of housing 1 of the vibration motor 100. And the second fixed part 42 can be easily attached to the vibrator 2 of the vibration motor 100. That is, it is convenient for spring 4 to be assembled in vibration motor 100.

Specifically in some embodiments, as shown in FIG. 5, the length of the first fixed part 41 and the second fixed part 42 can be different.

Specifically, in some embodiments, as shown in FIGS. 4 and 5, the first bending part 43 includes a first bending sub-part 21 and a second bending sub-part 22 that are connected end to end. The first bending sub-part 21 and the second bending sub-part 22 can be in the same plane. The front end of the first bending sub-part 21 can be connected to middle connection part 45. The rear end of the second bending sub-part 22 can be connected to the first elastic part 46. The first bending sub-part 21 can be rectangular, and the second bending sub-part 22 can be trapezoidal. And the width of the front end of the second bending sub-part 22 can be the same as the width of the first bending sub-part 21. The width of the front end of the second bending sub-part 22 may be greater than the width of the rear end of the second bending sub-part 22.

Similarly, the second bending part 44 includes a third bending sub-part 21 and a fourth bending sub-part 22 which are connected end to end. The third bending sub-part 21 and the fourth bending sub-part 22 can be in the same plane. The front end of the third bending sub-part 21 can be connected to the middle connection part 45. The rear end of fourth bending sub-part 22 can be connected to second elastic part 47. The third bending sub-part 21 may be rectangular, and the fourth bending sub-part 22 may be trapezoidal. The width of the front end of the fourth bending sub-part 22 can be the same as the width of the third bending sub-part 21. The width of the front end of the fourth bending sub-part 22 may be greater than the width of the rear end of the fourth bending sub-part 22.

Specifically in some embodiments, as shown in FIGS. 4 and 5, the first fixed part 41 includes a first fixed sub-part 41 and a second fixed sub-part 42 that are connected end to end. In addition, both the first fixed sub-part 41 and the second fixed sub-part 42 can be in the same plane. The front end of first fixed sub-part 41 can be connected to first elastic part 46. The first fixed sub-part 41 may be trapezoidal, and the second fixed sub-part 42 may be rectangular. The width of the front end of the first fixed sub-part 41 may be smaller than the width of the rear end of the first fixed sub-part 41. The width of the second fixed sub-part 42 may be the same as the width of the rear end of the first fixed sub-part 41.

The second fixed part 42 includes a third fixed sub-part 41 and a fourth fixed sub-part 42 which are connected end to end. The third fixed sub-part 41 and the fourth fixed sub-part 42 can be in the same plane. The front end of the third fixed sub-part 41 can be connected to the second elastic part 47. The third fixed sub-part 41 may be trapezoidal, and the fourth fixed sub-part 42 may be rectangular. The width of the front end of the third fixed sub-part 41 may be smaller than the width of the rear end of the third fixed sub-part 41. The width of the fourth fixed sub-part 42 can be the same as the width of the rear end of the third fixed sub-part 41.

Specifically in some embodiments, as shown in FIGS. 4 and 5, the width of both ends of the first elastic part 46 can be greater than the width of the middle part of the first elastic part 46. Specifically, in this embodiment, the side of the first elastic part 46 can be formed with an arc-shaped depression inward. In addition, the width of front end of the first elastic part 46 can be the same as the width of the rear end of the second bending sub-part 22. The width of the rear end of the first elastic part 46 can be the same as the width of the front end of the first fixed sub-part 41.

Similarly, the width of both ends of the second elastic part 47 can be greater than the width of the middle part of the second elastic part 47. Specifically, in this embodiment, the side of the second elastic part 47 can be formed with an arc-shaped depression inward. In addition, the width of the front end of the second elastic part 47 can be the same as the width of the end of the fourth bending sub-part 22. The width of the rear end of the second elastic part 47 can be the same as the width of the front end of the third fixed sub-part 41.

Understandably, as shown in FIGS. 3 to 5, along the extension line of the middle connection part 45 to the first fixed part 41 and the second fixed part 42, the spring 4 has a structure with wide ends and a narrow middle. Wherein, the wider first bending part 43 and the second bending part 44 can further strengthen the connection strength of the middle connection part 45. The wider first fixed part 41 can increase the contact area between the first fixed part 41 and housing 1 in the vibration motor 100. The wider second fixed part 42 can increase the contact area between the second fixed part 42 and the vibrator 2 in the vibration motor 100. The narrower the first elastic part 46 and the second elastic part 47 can make the first elastic part 46 and the second elastic part 47 have better elasticity while effectively reducing the weight of the entire spring 4. Of course, the sizes and relationships of middle connection part 45, first bending part 43, second bending part 44, first elastic part 46, second elastic part 47, first fixed part 41 and second fixed part 42 are not unique. As long as the middle connection part 45, the first bending part 43, the second bending part 44, the first elastic part 46, the second elastic part 47, the first fixed part 41 and the second fixed part 42 can achieve the above-mentioned effects, they all belong to the present invention embodiment to be protected. Scope.

In summary, compared with the prior art, the beneficial effects of the vibration motor 100 are:

The vibrator 2 (specifically the weight 21) in the vibration motor 100 is mainly supported by the spring 4 in the accommodation space 11 of the housing 1. Specifically, the spring 4 connects the first bending part 43 and the second bending part 44 through the middle connection part 45. The first bending part 43 and the second bending part 44 are closely attached to each other. And the middle connection part 45, first bending part 43 and second bending part 44 are integrated into a structure. The spring 4 has a compact structure and a small overall volume, so that when the spring 4 is assembled in the vibration motor 100, the spring 4 occupies a small space in the vibration motor 100. This effectively reduces the volume of the vibration motor 100. Second, because the middle connection part 45 only needs to connect the first bending part 43 and the second bending part 44 together. Therefore, the size requirements and process manufacturing requirements of the middle connection part 45 are not high, and the yield is high. It is suitable for mass production of the vibration motor 100. Third, the spring 4 is a one-piece structure. The first bending part 43 and the second bending part 44 are folded 180° at the middle connection part 45. That is, first bending part 43 and second bending part 2 can be closely attached to each other. Then use welding to fix the joints together. The splicing process requires low, and only a set of molds are needed in the manufacturing process, which is highly economical. This effectively reduces the manufacturing process requirements of the vibration motor 100.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration motor, including:
a housing with an accommodation space;
a vibrator accommodated in the accommodation space;
a stator fixed to the housing for driving the vibrator to vibrate;
a spring suspending the vibrator in the accommodation space, including a first fixed part connecting to the housing, a second fixed part connecting to the vibrator, and an elastic arm connecting the first fixed part to the second fixed part; wherein
the elastic arm includes a connection part, a first elastic part extending from one end of the connection part to the first fixed part, and a second elastic part extending from the other end of the connection part to the second fixed part;

the connection part includes a first bending part extending from an end of the first elastic part away from the first fixed part, a second bending part extending from an end of the second elastic part away from the second fixed part, and a middle connection part connecting the first bending part to the second bending part;
the first bending part, the second bending part and the middle connection part are integrally formed; and
the first bending part attaches to the second bending part;
an outer wall surface of the middle connection part is arcuate.

2. The vibration motor as described in claim 1, wherein, the first bending part attached to the second bending part by welding.

3. The vibration motor as described in claim 1, wherein, the outer wall surface of the middle connection part and an outer wall surface of the first bending part intersect to form a first joint; a cut surface of the outer arc surface of the middle connection part at the first joint is in the same plane as the outer wall surface of the first bending part;
the outer wall surface of the middle connection part and an outer wall surface of the second bending part intersect to form a second joint;
the cut surface of the outer arc surface of the middle connection part at the second joint is in the same plane as the outer wall surface of the second bending part.

4. The vibration motor as described in claim 1, wherein, the first bending part, second bending part, first elastic part, second elastic part, first fixed part and second fixed part are all sheet structures.

5. The vibration motor as described in claim 1, wherein, a distance between the first elastic part and the second elastic part gradually increases along a direction from the front end to the rear end of the first elastic part and the second elastic part.

6. The vibration motor as described in claim 1, wherein, the first fixed part and the second fixed part are arranged in parallel and spaced apart from each other.

7. The vibration motor as described in claim 1, wherein the first bending part includes:
a rectangular first bending sub-part having a front end connected to the middle connection part;
a trapezoidal second bending sub-part connecting to the first bending sub-part on a same plane, having a rear end connected to the first elastic part;
and wherein
a width of the front end of the second bending sub-part is consistent with a width of the first bending sub-part; the width of the front end of the second bending sub-part is greater than a width of the rear end of the second bending sub-part;
the second bending part includes
a rectangular third bending sub-part having a front end connected to the middle connection part;
a trapezoidal fourth bending sub-part connecting to the third bending sub-part on a same plane, having a rear end connected to the second elastic part;
and wherein
a width of the front end of the fourth bending sub-part is consistent with a width of the third bending sub-part; the width of the front end of the fourth bending sub-part is greater than a width of the rear end of the fourth bending sub-part.

8. The vibration motor as described in claim 7, wherein the first fixed part includes
a trapezoidal first fixed sub-part having a front end connected to the first elastic part;

a rectangular second fixed sub-part connected to the first fixed sub-part on a same plane; and wherein a width of the front end of the first fixed sub-part is smaller than a width of the rear end of the first fixed sub-part; the width the front end of the second fixed sub-part is consistent with a width of the rear end of the first fixed sub-part;

the second fixed part includes a trapezoidal third fixed sub-part having a front and a rear ends;

a rectangular fourth fixed sub-part connected to the third fixed sub-part on a same plane; a front end of the third fixed sub-part is connected to the second elastic part; and wherein a width of the front end of the third fixed sub-part is smaller than a width of the rear end of the third fixed sub-part; the width of the fourth fixed sub-part is consistent with a width of the rear end of the third fixed sub-part.

9. The vibration motor as described in claim 8, wherein, a width of both ends of the first elastic part is greater than a width of the middle part of the first elastic part; a width of the front end of the first elastic part is consistent with the width of the rear end of the second bending sub-part; the width of the rear end of the first elastic part is consistent with the width of the front end of the first fixed sub-part; and wherein the width of both ends of the second elastic part is greater than the width of the middle part of the second elastic part;

the width of the front end of the second elastic part is consistent with the width of the rear end of the fourth bending sub-part; and the width of the rear end of the second elastic part is consistent with the width of the front end of the third fixed sub-part.

* * * * *